United States Patent [19]

Furuta

[11] 4,322,765
[45] Mar. 30, 1982

[54] TAPE RECORDER WITH DISPLAY

[75] Inventor: Kenji Furuta, Hachioji, Japan

[73] Assignee: Olympus Optical Co. Ltd., Tokyo, Japan

[21] Appl. No.: 107,707

[22] Filed: Dec. 27, 1979

[30] Foreign Application Priority Data

Dec. 29, 1978 [JP] Japan ............................. 53-161574

[51] Int. Cl.³ .......................................... G11B 27/34
[52] U.S. Cl. ...................................... 360/137; 360/69
[58] Field of Search ................ 360/137, 33, 69, 71, 360/72.1, 72.3; 358/190; 179/100.1 R; 369/53, 58

[56] References Cited

U.S. PATENT DOCUMENTS

| | | | |
|---|---|---|---|
| 3,930,267 | 12/1975 | Plener | 360/69 |
| 3,949,425 | 4/1976 | Perret | 360/137 |
| 3,962,532 | 6/1976 | Aubert | 360/69 |
| 4,096,542 | 6/1978 | Pappas | 360/33 |
| 4,214,282 | 7/1980 | Sato | 360/137 |

Primary Examiner—James W. Moffitt
Assistant Examiner—Alan Faber
Attorney, Agent, or Firm—Toren, McGeady & Stanger

[57] ABSTRACT

In the recorder disclosed, a recorder assembly includes playback and motor control circuits and a signal generating device generates a signal proportional to the amount of tape travel. A counter interprets the signal from the generating device and an electro-optical display arrangement with an indicator displays the value of the signal at the counter. A power source serves for energizing both the assembly and the electro-optical display equipment, while a connecting arrangement connects the electro-optical display equipment to the power source. A tape travel detection circuit detects tape travel in response to the signal generating device. A switching element controlled by the output of the tape travel circuit is located between the assembly and the connecting arrangement so as to maintain the output of the electro-optical display equipment whether or not the recorder assembly is energized.

4 Claims, 1 Drawing Figure

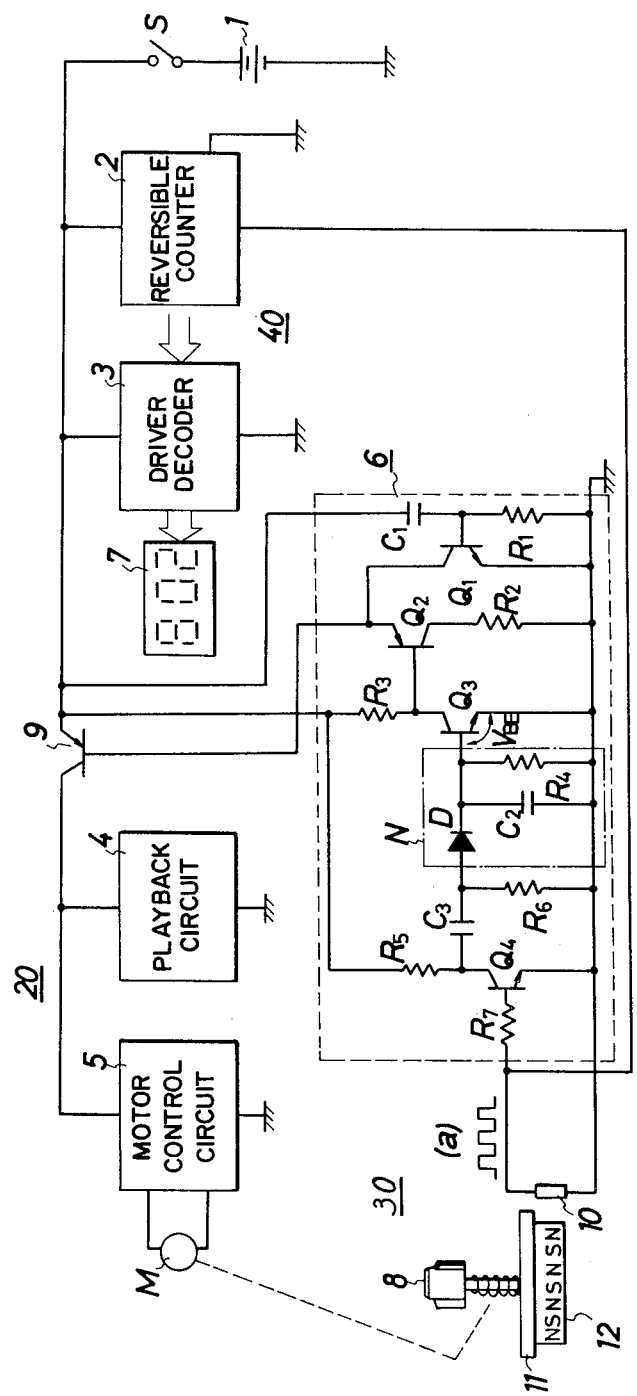

TAPE RECORDER WITH DISPLAY

BACKGROUND OF THE INVENTION

1. Field of the Invention

The present invention relates to a tape recorder with electro-optical display equipment, and more particularly to a tape recorder which can maintain the indication of tape travel displayed on the electro-optical display equipment even when the tape is not in motion.

2. Description of Prior Art

Tape recorders with tape travel indications using electro-optical devices, such as liquid crystal displays, are currently being developed. Such electro-optical devices are particularly useful as compared with former geared wheel counters because they permit a substantial reduction in size. This is important in the recent trend towards smaller and lighter tape recorders.

However, such electro-optical display equipment requires a power source; therefore formerly the tape recorder itself and the indicator equipment used a common power source. By doing so when tape winding is completed the automatic-stop equipment comes into operation, and the tape recorder changes from operating condition to stop condition, and at the same time, the power source is switched off. Therefore the indication of tape travel amount is also switched off.

Thus the tape travel amount can not be checked when the tape is not in motion, so it is then not possible to rewind accurately to a desired tape position.

For example, when a change of mode is required in the middle of a tape, such as switching over to playback, and then returning to the original mode, and continuous tape travel monitoring is required, at the point at which tape travel ceases and the power supply is disconnected the indicator ceases to function, and this results in inaccurate tape position indications for the whole tape.

Therefore in order to provide a means of countering this inconvenience a separate power supply would have to be provided for the tape travel indication equipment. But in doing so, further space would need to be specially provided to accept such a power source, for example, batteries. Therefore this would hinder the attainment of smaller, lighter tape recorder designs.

SUMMARY OF THE INVENTION

An object of the present invention is to eliminate the above-described drawbacks of the tape recorder.

Another object of this invention is to offer a tape recorder which can maintain tape travel amount indication on electro-optical display equipment even when the tape is not in motion.

To achieve the above objectives, the tape recorder according to this invention comprises the tape recorder itself possessing playback and motor control circuits, a signal generating device which generates a signal proportionate to tape travel amount, a counter which interprets the signal generated by the signal generating device, electro-optical display equipment which displays the value of the signal, a power source supplying both the tape recorder itself and the electro-optical display equipment, a power supply on/off switch linked to the operating equipment of the tape recorder, a tape travel detection circuit which detects tape travel using the signal from the signal generating device, and a switching element controlled by the output of the tape travel detection circuit, positioned between the power connection to the electro-optical display equipment and the tape recorder itself. The power source switch is inserted between the power source and both the tape recorder itself and the electro-optical display equipment. The switching element is transistorized.

BRIEF DESCRIPTION OF THE DRAWING

FIG. 1 is a circuit diagram giving one example of this invention.

DESCRIPTION OF THE PREFERRED EMBODIMENT

Shown in FIG. 1 is a circuit diagram of one example of this invention. Reference numeral 1 in FIG. 1 represents the power source, for example, batteries, to which a switch S is connected. This power source switch S is linked to the record, playback, and fast wind operation controls of the tape recorder. The other end of power source switch S is connected through a switching element, for example, transistor 9, to a tape recorder assembly 20 composed of a playback circuit 4, motor control circuit 5, and a motor M. This transistor 9 responds to a tape travel detection circuit 6, which detects tape travel such as by responding to the tape reaching its end. This tape travel detection circuit 6 includes a fixed time circuit with a capacitor C1 and a resistor R1, one end of which is connected to the emitter of transistor 9, and the other end grounded. The base of a transistor Q1 is connected between capacitor C1 and resistor R1. The emitter of transistor Q1 is grounded and the collector is connected to the emitter of transistor Q2 and also to the base of the transistor 9. The collector of transistor Q2 is grounded through resistor R2. The base of transistor Q2 is connected to the collector of transistor Q3. The emitter of transistor Q3 is grounded, the collector is connected to the emitter of the transistor 9 through resistor R3, and the base is connected to rectifier circuit N. This rectifier circuit N consists of diode D, capacitor C2, and resistor R4. The collector of a transistor Q4 is connected, through resistor R5, between the resistor R3 and transistor 9. The emitter of this transistor Q4 is grounded and the collector is also connected to rectifier circuit N through capacitor C3. The connection between capacitor C3 and rectifier circuit N is grounded through resistor R6. The base of the transistor Q4 is connected to a signal generating device 30 through resistor R7. The signal generating device 30 has a tape drive shaft spindle 8 which is driven by the motor M, and a rotor 11 which revolves with the shaft spindle 8. Arranged around this rotor 11 is a multi-magnet 12 located closely to a Hall element 10. A pulse signal is generated by this arrangement which is proportionate to the amount of tape travel, is shown as (a).

Furthermore, electro-optical display equipment 40 is connected between power source switch S and transistor 9. This electro-optical display equipment 40 consists of a reversible counter 2, which interprets the pulse signal of the signal generating device 30, a driver/decoder (driver and decoder) 3, and, for example, a visual display component 7 such as a liquid crystal display. In this example the reversible counter 2 and driver/decoder 3 have charge and discharge circuits (not shown in the diagram) so that, if, after the power source switch S has been on, the power source switch S is subsequently thrown off, these circuits open for a fixed period of time.

In the tape recorder as descrived above, when the power source switch S is thrown in by the tape recorder operation, the power is supplied to the reversible counter 2 and driver/decoder 3 and, at the same time, transistor Q1, through capacitor C1 of the tape travel detection circuit 6, is activated for a fixed time which is determined by the fixed time circuit composed of $C_1$ and $R_1$. By this means, base current is supplied to transistor 9 and activates this compoent. Therefore power is supplied to playback circuit 4 and motor control circuit 5, motor M is activated and tape travel is initiated. Once tape transportation has started, i.e. shaft 8 revolves, the alternate magnetic poles N-S-N-S of the permanent multimagnet 12 arranged around rotor 11 are brought close to the Hall element 10, and a pulse signal is generated from the Hall element, shown as (a). This pulse signal is received by tape travel detection circuit 6 and reversible counter 2, and in reversible counter 2, based on the tape travel direction, the signal is interpreted and the result of the computation passed through the driver/decoder 3 to the visual display component 7.

Furthermore, the pulse signal received by tape travel detection circuit 6 is rectified through rectifier circuit N, and compared with the voltage $V_{BE}$ between the base and emitter of transistor Q3. When the pulse signal input has a shorter interval than the constant value of the rectifier circuit N, transistor Q3 is activated.

Therefore, transistor Q2 is activated and holds transistor 9 in an active mode. By this means, when the tape reaches the end, the revolution of drive shaft 8 ceases and there is no output from rectifier circuit N, transistor Q3 and Q2 switch out one after the other. Therefore transistor 9 switches out as well and cuts the power supply to playback circuit 4 and motor control circuit 5.

In this case, at the end of a tape, when tape travel has ceased, the power source switch S opens as a result. However, the display details on the visual display component 7 are held in view, as reversible counter 2 and driver/decoder 3 of the electro-optical display equipment 40 are both left in circuit by virtue of the charge and discharge circuits.

Therefore the tape can be wound back to a certain fixed position while looking at the indication of the tape amount displayed in the visual display component 7, and a continuous monitoring of tape amount can be made. In the above explanation only the end-of-tape position has been considered, but the same holds true for mid-tape mode changes; for example, when the operating mode is changed in the middle of a tape, from recording to playback mode, etc., the power source switch S is temporarily opened, but the indication of tape amount on the visual display component 7 is maintained.

Therefore according to this arrangement the indication of tape amount on the electro-optical display equipment can be maintained even when the power source switch opens with tape travel arrest, and accuracy of tape position is available at any time, while highly efficient record, playback, rewind, and fast-forward operations of the tape recorder can be made.

In addition, the present invention is not limited to the above embodiment, but can be modified within the scope of claim. For example, the power source switch S may be inserted between the tape recorder section 20 itself and the electro-optical display equipment 40, and the electro-optical display equipment 40 may connected directly to the power source 1. By this means a constant power source is provided for the electro-optical display equipment 40 and the charge and discharge circuits for the reversible counter 2 and driver/decoder 3 are then not necessary.

What is claimed is:

1. A tape recorder comprising an assembly including playback and motor control circuits; a signal generating device which generates a signal proportional to the amount of tape travel; a counter to interpret the signal from the signal generating device; electro-optical display equipment having an indicator to display the value of the calculation of the counter; a power source for energizing both the assembly and the electro-optical display equipment; connecting means for connecting the electro-optical display equipment to the power source; a tape travel detection circuit which detects tape travel from the signal from the signal generating device; and a switching element controlled by the output of the tape travel detecting circuit and located between the assembly and the connecting means.

2. A tape recorder as set forth in claim 1, wherein a power source switch is connected at said connecting means both between the power source and the assembly, and between the power source and the electro-optical display element.

3. A tape recorder as set forth in claim 1, wherein a power source switch is inserted between only the assembly and the power source.

4. A tape recorder as set forth in claim 1, wherein the switching element includes a transistor.

* * * * *